US012776903B2

(12) United States Patent
Lu

(10) Patent No.: US 12,776,903 B2
(45) Date of Patent: Oct. 27, 2026

(54) DATA PREPROCESSING METHODS, DATA ENCRYPTION METHODS, APPARATUSES, AND DEVICES

(71) Applicant: ALIPAY (HANGZHOU) INFORMATION TECHNOLOGY CO., LTD., Hangzhou (CN)

(72) Inventor: Yufei Lu, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 466 days.

(21) Appl. No.: 18/358,777

(22) Filed: Jul. 25, 2023

(65) Prior Publication Data

US 2024/0031145 A1 Jan. 25, 2024

(30) Foreign Application Priority Data

Jul. 25, 2022 (CN) ......................... 202210875433.6

(51) Int. Cl.
*H04L 9/08* (2006.01)

(52) U.S. Cl.
CPC .................................. *H04L 9/0869* (2013.01)

(58) Field of Classification Search
CPC ..... H04L 9/0869; H04L 9/008; H04L 9/3066; H04L 63/0428; H04L 63/20
See application file for complete search history.

(56) References Cited

U.S. PATENT DOCUMENTS

2006/0120532 A1* 6/2006 Kean ........................ H04L 9/085 380/277
2016/0294555 A1* 10/2016 Jakobsson ............. H04L 9/0836
2020/0145203 A1* 5/2020 Sun ........................ H04L 9/0836
(Continued)

FOREIGN PATENT DOCUMENTS

CN 103973449 A 8/2014
CN 108924103 A 11/2018
(Continued)

OTHER PUBLICATIONS

Preprocessing Based Verification of Multiparty Protocols with Honest Majority Peeter Laud, Alisa Pankova, and Roman Jagomägis (Year: 2017).*
(Continued)

*Primary Examiner* — Moeen Khan
*Assistant Examiner* — Thomas A Carnes
(74) *Attorney, Agent, or Firm* — Fish & Richardson P.C.

(57) ABSTRACT

Some embodiments of this specification disclose data encryption and data preprocessing. In an implementation, a method includes for online data encryption: generating, based on plaintext data, a second component of ciphertext data. From a data set and as a selected first component of ciphertext data, a first component of ciphertext data is selected. Based on the first component of ciphertext data and the second component of ciphertext data, ciphertext data of plaintext data is calculated. For offline data preprocessing, the first component of ciphertext data is generated and plaintext encryption uses the first component of ciphertext data and the second component of ciphertext data. Alternatively, a data acquisition request is received, the first component of ciphertext data is generated, and fed back, and stored for use in plaintext encryption.

20 Claims, 5 Drawing Sheets

(56) References Cited

U.S. PATENT DOCUMENTS

| | | | | |
|---|---|---|---|---|
| 2020/0266972 | A1 | 8/2020 | Chakraborty et al. | |
| 2020/0320211 | A1* | 10/2020 | Moore | H04L 63/12 |
| 2020/0396063 | A1* | 12/2020 | Veeningen | H04L 9/3242 |
| 2021/0083843 | A1* | 3/2021 | Salomon | G06F 21/602 |
| 2021/0243020 | A1* | 8/2021 | Mukherjee | H04L 9/085 |
| 2021/0352054 | A1* | 11/2021 | Urian | H04L 9/0825 |
| 2021/0377010 | A1* | 12/2021 | Kong | H04L 63/045 |
| 2022/0173886 | A1* | 6/2022 | Sardesai | H04L 9/0819 |
| 2022/0247551 | A1* | 8/2022 | Joye | H04L 9/008 |
| 2023/0247010 | A1* | 8/2023 | O'Connell | H04L 9/065<br>713/151 |
| 2023/0327850 | A1* | 10/2023 | Ghazi | H04L 9/14<br>713/193 |
| 2023/0327856 | A1* | 10/2023 | Lu | H04L 9/0825<br>713/171 |
| 2024/0169256 | A1* | 5/2024 | Gong | G06N 3/0985 |
| 2024/0356743 | A1* | 10/2024 | Capkun | H04L 9/0894 |

FOREIGN PATENT DOCUMENTS

| | | | | |
|---|---|---|---|---|
| CN | 109257165 A | | 1/2019 | |
| CN | 109274659 A | | 1/2019 | |
| CN | 109359471 A | | 2/2019 | |
| CN | 110391895 A | | 10/2019 | |
| CN | 113965314 A | | 1/2022 | |
| CN | 113987558 A | | 1/2022 | |
| CN | 114444108 A | | 5/2022 | |
| JP | 2010140026 A | * | 6/2010 | H04L 9/06 |
| WO | 2020006692 A1 | | 1/2020 | |
| WO | WO-2023242955 A1 | * | 12/2023 | H04L 9/0852 |

OTHER PUBLICATIONS

Fedai.org [online], "Federated AI Ecosystem," available on or before Oct. 18, 2007, via Internet Archive: Wayback Machine URL<http://web.archive.org/web/20070801000000*/www.fedai.org>, retreived on May 15, 2023, URL<https://www.fedai.org>, 6 pages.

Github.com [online], "FederatedAI/FATE," available on or before Apr. 17, 2020, via Internet Archive: Wayback Machine URL<http://web.archive.org/web/20200801000000*/https://github.com/FederatedAI/FATE>, retreived on May 15, 2023, URL<https://github.com/FederatedAI/FATE>, 4 pages.

Yang et al., "Research on algorithms of data encryption scheme that supports homomorphic arithmetical operation," Journal on Communications, Jan. 2015, 36(1), 12 pages (with English abstract).

* cited by examiner

DATA PREPROCESSING METHODS, DATA ENCRYPTION METHODS, APPARATUSES, AND DEVICES

CROSS-REFERENCE TO RELATED APPLICATIONS

This application claims priority to Chinese Patent Application No. 202210875433.6, filed on Jul. 25, 2022, which is hereby incorporated by reference in its entirety.

TECHNICAL FIELD

Some embodiments of this specification relate to the field of computer technologies, and in particular, to data preprocessing methods, data encryption methods, apparatuses, and devices.

BACKGROUND

With increasing data types and quantities, data encryption technologies are widely used to avoid losses caused by leakage of sensitive data such as company data and customer data.

In current data encryption technologies, an encryption process consumes a relatively long time, thereby affecting service processing efficiency.

SUMMARY

Some embodiments of this specification provide data preprocessing methods, data encryption methods, apparatuses, and devices.

A first aspect of some embodiments of this specification provides a data preprocessing method, including: generating a first component of ciphertext data; and storing the first component in a data set so that when plaintext data need to be encrypted, a second component of the ciphertext data is generated based on the plaintext data, the first component is selected from the data set, and the ciphertext data are calculated based on the first component and the second component.

A second aspect of some embodiments of this specification provides a data preprocessing method, including: receiving a data acquisition request; generating a first component of ciphertext data; and feeding back the first component, where the first component is stored in a data set so that when plaintext data need to be encrypted, a second component of the ciphertext data is generated based on the plaintext data, the first component is selected from the data set, and the ciphertext data are calculated based on the first component and the second component.

A third aspect of some embodiments of this specification provides a data encryption method, including: generating a second component of ciphertext data based on plaintext data; selecting a first component of the ciphertext data from a data set; and calculating the ciphertext data of the plaintext data based on the first component and the second component.

A fourth aspect of some embodiments of this specification provides a data preprocessing apparatus, including: a generation unit, configured to generate a first component of ciphertext data; and a storage unit, configured to store the first component in a data set so that when plaintext data need to be encrypted, a second component of the ciphertext data is generated based on the plaintext data, the first component is selected from the data set, and the ciphertext data are calculated based on the first component and the second component.

A fifth aspect of some embodiments of this specification provides a data preprocessing apparatus, including: a receiving unit, configured to receive a data acquisition request; a generation unit, configured to generate a first component of ciphertext data; and a feedback unit, configured to feed back the first component, where the first component is stored in a data set so that when plaintext data need to be encrypted, a second component of the ciphertext data is generated based on the plaintext data, the first component is selected from the data set, and the ciphertext data are calculated based on the first component and the second component.

A sixth aspect of some embodiments of this specification provides a data encryption apparatus, including: a generation unit, configured to generate a second component of ciphertext data based on plaintext data; a selection unit, configured to select a first component of the ciphertext data from a data set; and a calculation unit, configured to calculate the ciphertext data of the plaintext data based on the first component and the second component.

A seventh aspect of some embodiments of this specification provides a computer device, including: at least one processor; and a memory storing a program instruction, where the program instruction is configured for execution by the at least one processor, and the program instruction includes an instruction used to perform the method according to the first aspect or the second aspect.

According to the technical solutions provided in some embodiments of this specification, before the plaintext data are encrypted, the first component of the ciphertext data can be pre-generated, and the first component can be stored in the data set. As such, when the plaintext data need to be encrypted, the second component of the ciphertext data can be generated based on the plaintext data, the first component can be selected from the data set, and the ciphertext data can be calculated based on the first component and the second component. Therefore, when the plaintext data need to be encrypted, the ciphertext data can be quickly obtained.

BRIEF DESCRIPTION OF DRAWINGS

To describe the technical solutions in some embodiments of this specification or in an existing technology more clearly, the following briefly describes the accompanying drawings needed for describing the embodiments or the existing technology. The accompanying drawings in the following descriptions merely show some embodiments of this specification, and a person of ordinary skill in the art can still derive other drawings from these accompanying drawings without creative efforts.

DESCRIPTION OF EMBODIMENTS

Figure 1:
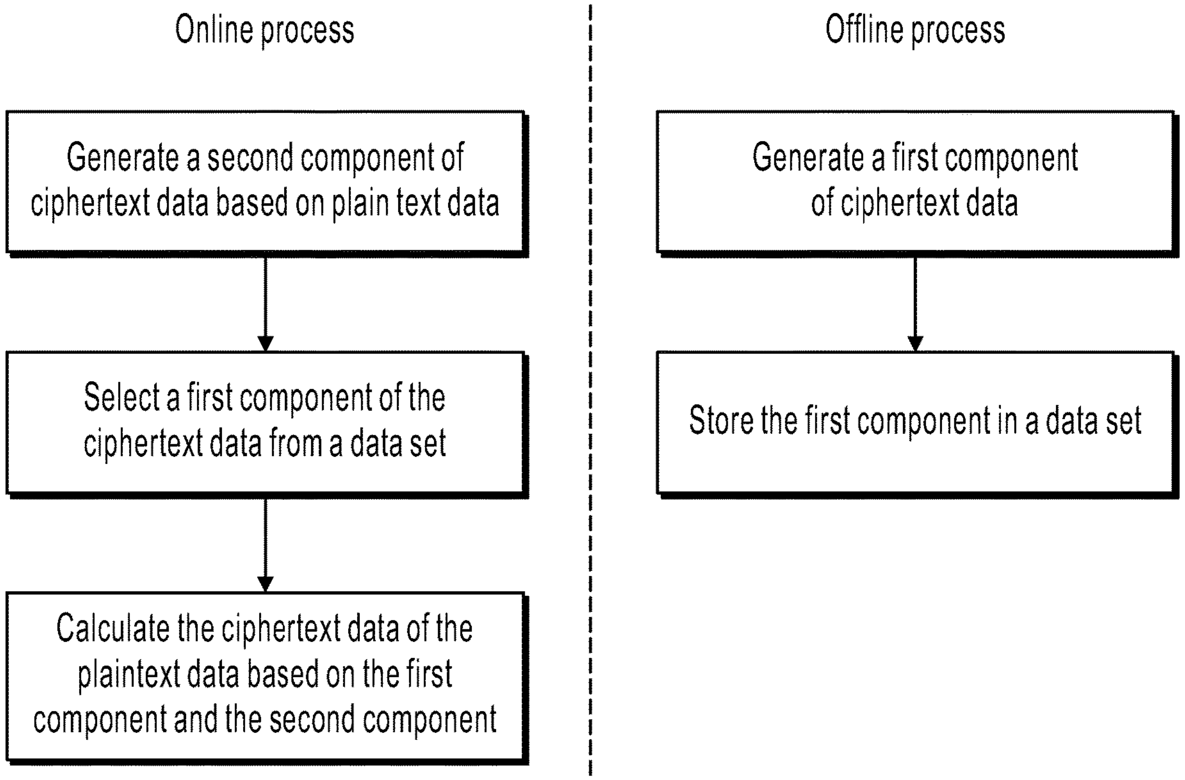
FIG. 1 is a schematic diagram illustrating an encryption process, according to some embodiments of this specification.

The following clearly and comprehensively describes the technical solutions in some embodiments of this specification with reference to the accompanying drawings in some embodiments of this specification. Clearly, the described embodiments are merely some but not all of embodiments of this specification. All other embodiments obtained by a person of ordinary skill in the art based on some embodiments of this specification without creative efforts shall fall within the protection scope of this specification.

In the field of secure multi-party computation, secure multi-party computation based on homomorphic encryption can be applied to a plurality of service scenarios, such as a medical scenario, a model training scenario, and a risk prediction scenario. For example, a service scenario can include: A group of people want to calculate an average salary, but don't want others to know their salary. For another example, another service scenario can include: Two aggressive millionaires meet, and they want to know who is richer, but do not want to disclose their financial information.

Homomorphic encryption is a data encryption technology. It allows direct operation on ciphertext data to obtain an encrypted result. A result obtained by decrypting the encrypted result is the same as a result obtained by performing the same operation on plaintext data. Homomorphic encryption algorithms can include a partially homomorphic encryption (PHE) algorithm and a fully homomorphic encryption (FHE) algorithm. The partially homomorphic encryption algorithm can support a homomorphic addition operation or a homomorphic multiplication operation. The partially homomorphic encryption algorithm supporting the homomorphic addition operation is also referred to as an additive homomorphic encryption algorithm. The partially homomorphic encryption algorithm supporting the homomorphic multiplication operation is also referred to as a multiplicative homomorphic encryption algorithm. The additive homomorphic encryption algorithm can support the following operations: addition of homomorphic ciphertext data and homomorphic ciphertext data, addition of homomorphic ciphertext data and plaintext data, and multiplication of homomorphic ciphertext data and plaintext data. However, the additive homomorphic encryption algorithm does not support the following operation: multiplication of homomorphic ciphertext data and homomorphic ciphertext data. The multiplicative homomorphic encryption algorithm can support the following operations: multiplication of homomorphic ciphertext data and homomorphic ciphertext data, multiplication of homomorphic ciphertext data and plaintext data, and addition of homomorphic ciphertext data and plaintext data. However, the multiplicative homomorphic encryption algorithm does not support the following operation: addition of homomorphic ciphertext data and homomorphic ciphertext data. The fully homomorphic encryption algorithm can support both the homomorphic addition operation and the homomorphic multiplication operation.

Homomorphic encryption has good cryptographic properties. However, an encryption process consumes a relatively long time, thereby affecting service processing efficiency.

The inventors find that the encryption process of the encryption algorithm can be split into an offline process and an online process. The offline process is unrelated to the plaintext data that need to be encrypted, and therefore can be performed in advance. The online process is related to the plaintext data that need to be encrypted. When the plaintext data need to be encrypted, an execution result of the offline process can be directly obtained. An execution result of the online process can be obtained based on the plaintext data. The ciphertext data of the plaintext data can be calculated based on the execution result of the offline process and the execution result of the online process. As such, the offline process is performed in advance. Therefore, when the plaintext data need to be encrypted, only the online process can be performed, thereby reducing a calculation amount, facilitating fast obtaining of ciphertext data, and improving service processing efficiency.

The additive homomorphic encryption algorithm is used as an example. The additive homomorphic encryption algorithm can include a Paillier algorithm, an Okamoto-Uchiyama (OU) algorithm, and the like. Keys involved in the homomorphic encryption algorithm include a public key and a private key. The public key is used to encrypt plaintext data to obtain homomorphic ciphertext data. An encrypted result can be obtained by performing an operation on the homomorphic ciphertext data. The private key is used to decrypt a result. The plaintext data can be encrypted based on formula $c={}^{m}h^{r}$ mod n, where c represents homomorphic ciphertext data, r represents a random number, m represents plaintext data, (n, g, h) represents a public key, and mod represents a modulo operation. A calculation process of $h^r$ is unrelated to the plaintext data m, and can be an offline process. A calculation process of ${}^{m}$ is related to the plaintext data m, and can be an online process. Before the plaintext data m are encrypted, $h^r$ can be calculated in advance. As such, when the plaintext data m need to be encrypted, a calculation result of $h^r$ can be directly obtained. The homomorphic ciphertext data c can be calculated based on the calculation result of $h^r$, and g, m and n. As such, when the plaintext data m are encrypted, calculation of $h^r$ is not needed. Therefore, a calculation amount is reduced, and the ciphertext data c can be quickly obtained.

In some embodiments, referring to FIG. 1, the offline process and the online process can be deployed on one device. Some embodiments of this specification can provide an encryption device. The encryption device can include any apparatus, device, platform, device cluster, or the like having computing and processing capabilities. The encryption device can generate a first component of ciphertext data. The first component can be stored in a data set. When the plaintext data need to be encrypted, the encryption device can generate a second component of the ciphertext data based on plaintext data, select the first component from the data set, and calculate the ciphertext data based on the first component and the second component.

In some embodiments, referring to FIG. 1, the offline process and the online process can be deployed on different devices, respectively. Some embodiments of this specification can provide an encryption system. The encryption system can include a first device and a second device. The first device and the second device can include any apparatus, device, platform, device cluster, or the like having computing and processing capabilities. The first device is configured to implement the online process, and the second device is configured to implement the offline process. Specifically, the first device can send a data acquisition request to the second device. The second device can receive the data acquisition request, generate the first component of the ciphertext data, and feed back the first component to the first device. The first device can receive the first component, and store the first component in the data set. When the plaintext data need to be encrypted, the first device can generate the second component of the ciphertext data based on the plaintext data, select the first component from the data set, and calculate the ciphertext data based on the first component and the second component.

In the above-mentioned embodiments, the offline process and the online process can be used to implement an encryption algorithm. The encryption algorithm can include a homomorphic encryption algorithm. The homomorphic encryption algorithm can include a partially homomorphic encryption algorithm and a fully homomorphic encryption algorithm. The partially homomorphic encryption algorithm can include an additive homomorphic encryption algorithm and a multiplicative homomorphic encryption algorithm. Certainly, the encryption algorithm can further include another encryption algorithm, for example, a non-homomorphic encryption algorithm such as a DES algorithm, an AES algorithm, an IDEA algorithm, or an RSA algorithm.

Some embodiments of this specification provide a data preprocessing method. The data preprocessing method can be applied to the encryption device. The encryption device can include any apparatus, device, platform, device cluster, or the like having computing and processing capabilities.

Figure 2:
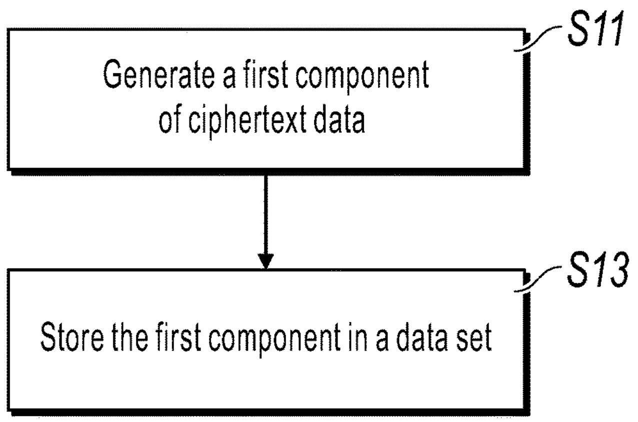
FIG. 2 is a schematic flowchart illustrating a data preprocessing method, according to some embodiments of this specification.

Referring to FIG. 2, the data preprocessing method is used to implement the offline process, and can specifically include the following steps.

Step S11: Generate a first component of ciphertext data.

In some embodiments, the component can refer to an amount obtained when data are divided into several parts. For example, one vector is decomposed into a sum of vectors in a plurality of directions, and a vector in each direction can be referred to as one component. The ciphertext data can include homomorphic ciphertext data. Generation of the first component is unrelated to the plaintext data. Therefore, before the plaintext data need to be encrypted, the first component of the ciphertext data can be pre-generated so that the ciphertext data are quickly obtained.

In some embodiments, the first component of the ciphertext data can be generated based on an encryption key (which is referred to as a first encryption key below). The first encryption key can include a public key. The first key can be calculated based on a key generation algorithm. The key generation algorithm can include an elliptic curve algorithm and the like. For example, a large prime number p and a large prime number q can be generated. $n=^2$ can be calculated. A random number g can be generated. h=g mod n can be calculated. The random number g meets the following conditions: $g<n$ and $g^{-1}\neq 1 \bmod^2$. In such case, the public key can include (n, g, h), and the private key can include (p, q). The first encryption key can include the public key h. The public key g and the public key n can be respectively a second encryption key and a third encryption key in the following description.

The first component of the ciphertext data can be generated directly based on the first encryption key. Alternatively, a random number can be generated. The first component of the ciphertext data can be generated based on the random number and the first encryption key. The random number can include a random positive integer and the like. In practice, the first component of the ciphertext data can be generated using a predetermined algorithm. For example, the first component of the ciphertext data can be calculated based on the formula $h^r$, where h represents the first encryption key, and r represents the random number.

Step S13: Store the first component in the data set.

In some embodiments, the first component can be stored in the data set. As such, when the plaintext data need to be encrypted, the second component of the ciphertext data can be generated based on the plaintext data, the first component of the ciphertext data can be selected from the data set, and the ciphertext data of the plaintext data can be calculated based on the first component and the second component. The data set can be implemented in a form of a data pool, a data table, a linear table, a queue, a stack, a graph, or the like. The data set can include a first component of one or more pieces of ciphertext data. The data set can be located in a memory. The memory can include an internal memory, an external memory, and the like. The external memory can include a disk storage device, a solid-state storage device, a flash memory device, a network attached storage, and the like.

In some embodiments, it can be detected whether a data volume of the data set reaches a threshold. If the data volume of the data set does not reach the threshold, the first component of the ciphertext data can be generated. The data volume of the data set can include an amount of data in the data set. The threshold can include a maximum amount of data that the data set can accommodate. Alternatively, the threshold can further include a specific value that is smaller than the maximum amount of data. The threshold can be an empirical value. Alternatively, the threshold can be obtained through machine learning. For example, the maximum amount of data that the data set can accommodate can be 1.5 million, and the threshold can be 1 million. If the data volume of the data set is less than 1 million, the first component of the ciphertext data can be generated. Alternatively, considering that generation of the first component occupies a computer resource (for example, a memory resource), which affects real-time calculation of the ciphertext data, it can be detected whether there is a task for encrypting the plaintext data at present. If there is no task for encrypting the plaintext data, the first component of the ciphertext data can be generated. As such, real-time calculation efficiency of the ciphertext data can be improved so that the ciphertext data are quickly obtained.

According to the data preprocessing method in some embodiments of this specification, before the plaintext data are encrypted, the first component of the ciphertext data can be pre-generated, and the first component can be stored in the data set. As such, when the plaintext data need to be encrypted, the second component of the ciphertext data can be generated based on the plaintext data, the first component can be selected from the data set, and the ciphertext data can be calculated based on the first component and the second component. Therefore, when the plaintext data need to be encrypted, the ciphertext data can be quickly obtained.

Some embodiments of this specification provide another data preprocessing method. The data preprocessing method can be applied to the second device. The second device can include any apparatus, device, platform, device cluster, or the like having computing and processing capabilities.

Figure 3:
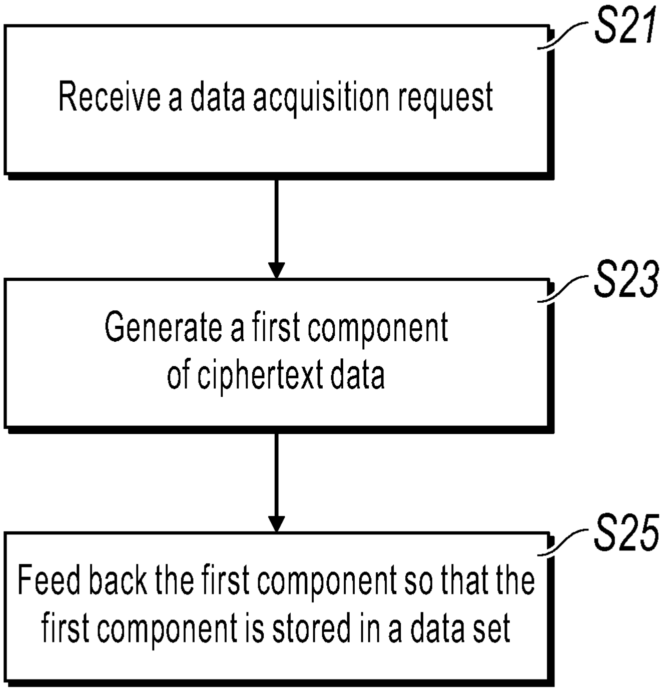
FIG. 3 is a schematic flowchart illustrating a data preprocessing method, according to some embodiments of this specification.

Referring to FIG. 3, the data preprocessing method is used to implement the offline process, and can specifically include the following steps.

Step S21: Receive a data acquisition request.

Step S23: Generate a first component of ciphertext data.

Step S25: Feed back the first component so that the first component is stored in a data set.

In some embodiments, the first device can send a data acquisition request to the second device. The second device can receive the data acquisition request, generate the first component of the ciphertext data, and feed back the first component to the first device. The first device can receive the first component, and store the first component in the data set. As such, when the plaintext data need to be encrypted, the second device can generate the second component of the ciphertext data based on the plaintext data, select the first component of the ciphertext data from the data set, and calculate the ciphertext data of the plaintext data based on the first component and the second component.

The first device can detect whether a data volume of the data set reaches a threshold. If the data volume of the data set does not reach the threshold, the first device can send a data acquisition request to the second device. The threshold can include a maximum amount of data that the data set can accommodate. Alternatively, the threshold can further include a specific value that is smaller than the maximum amount of data.

The second device can generate one first component and feed back one first component. Correspondingly, the first device can receive one first component and store one first component in the data set. Alternatively, to improve efficiency, the second device can further generate a plurality of first components in batches, and feed back the plurality of first components. Correspondingly, the first device can receive a plurality of first components, and store the plurality of first components in the data set. A quantity of first components that need to be generated for each data acquisition request can be agreed between the first device and the second device. The second device can generate a plurality of first components in batches in compliance with the agreement. Alternatively, the data acquisition request can further include a specified quantity. The second device can generate the specified quantity of first components. For example, the first device can acquire a current data volume of the data set. The current data volume can be subtracted from the maximum amount of data that the data set can accommodate, to obtain the specified quantity.

According to the data preprocessing method in some embodiments of this specification, before the plaintext data are encrypted, the first component of the ciphertext data can be pre-generated, and the first component can be stored in the data set. As such, when the plaintext data need to be encrypted, the second component of the ciphertext data can be generated based on the plaintext data, the first component can be selected from the data set, and the ciphertext data can be calculated based on the first component and the second component. Therefore, when the plaintext data need to be encrypted, the ciphertext data can be quickly obtained.

Figure 4:
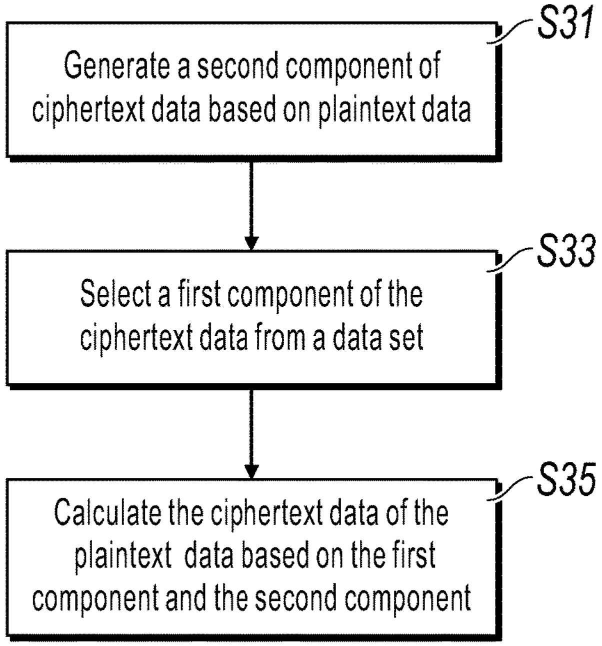
FIG. 4 is a schematic flowchart illustrating a data encryption method, according to some embodiments of this specification.

Some embodiments of this specification provide a data encryption method. The data encryption method can be applied to an encryption device or a first device. The encryption device and the first device can include any apparatus, device, platform, device cluster, or the like having computing and processing capabilities. Referring to FIG. 4, the data encryption method is used to implement an online process, and can specifically include the following steps.

Step S31: Generate a second component of ciphertext data based on plaintext data.

In some embodiments, the plaintext data can include service data such as user data, product data, transaction data, and behavior data. The user data can include an age, a gender, an occupation, and the like. The product data can include a product category, comment data, and the like. The transaction data can include a transaction amount, a transaction channel, and the like. The behavior data can include transaction behavior data, payment behavior data, and the like. The plaintext data can include text data, image data, video data, audio data, and the like. In practice, the plaintext data can be generated by the encryption device or the first device. Alternatively, the plaintext data can be sent by another device to the encryption device or the first device.

In some embodiments, a second component of the ciphertext data can be generated based on the plaintext data and an encryption key (which is referred to as a second encryption key below). The second encryption key can include a public key. The second encryption key can be calculated based on a key generation algorithm. The key generation algorithm can include an elliptic curve algorithm. The second encryption key and the first encryption key can be the same or different. For a method for generating the second encryption key, references can be made to the method for generating the first encryption key.

In practice, the second component of the ciphertext data can be generated using a predetermined algorithm. For example, the second component of the ciphertext data can be calculated based on the formula $g^m$, where g represents the second encryption key, and m represents the plaintext data.

Step S33: Select a first component of the ciphertext data from a data set.

In some embodiments, the data set can include a first component of one or more pieces of ciphertext data. The first component can be randomly selected from the data set. Alternatively, the first component can be selected from the data set in another method. For example, the first component in the data set can correspond to a generation time. A first component with the earliest generation time can be selected from the data set.

In some embodiments, to enhance security of ciphertext data and increase cracking difficulty, different first components can be used to calculate corresponding ciphertext data for different plaintext data. Therefore, after the first component is selected from the data set, the selected first component can be deleted to avoid reuse of the first component. In other words, the first component in the data set is constantly consumed. Therefore, a first component needs to be constantly generated to supplement the first component in the data set.

In some embodiments, it can be detected whether the data set is empty. If the data set is not empty, the first component of the ciphertext data can be selected from the data set. If the data set is empty, the first component of the ciphertext data can be generated. A specific generation process is not described herein again.

Step S35: Calculate the ciphertext data of the plaintext data based on the first component and the second component.

In some embodiments, the ciphertext data can include homomorphic ciphertext data. The ciphertext data can be calculated using a predetermined algorithm. For example, a mathematical operation such as addition, subtraction, multiplication, or division can be performed on the first component and the second component to obtain the ciphertext data. In practice, the ciphertext data can be calculated only based on the first component and the second component. Alternatively, the ciphertext data can be calculated based on the first component, the second component, and an encryption key (which is referred to as a third encryption key below). The third encryption key can include a public key. The third encryption key can be calculated based on a key generation algorithm. The key generation algorithm can include an elliptic curve algorithm and the like. The third encryption key, the second encryption key, and the first encryption key can be different. Alternatively, any two or more of the third encryption key, the second encryption key, and the first encryption key can be the same. For example, the ciphertext data can be calculated based on formula $c=g^m h^r \bmod n$, where $h^r$ represents the first component of the ciphertext data, $g^m$ represents the second component of the ciphertext data, and n represents the third encryption key.

In some embodiments, the data encryption method can be applied to the first device. The first device can send a data acquisition request to the second device. The second device can receive the data acquisition request, generate the first component of the ciphertext data, and feed back the first component to the first device. The first device can receive the first component, and store the first component in the data set.

According to the data encryption method in some embodiments of this specification, when the plaintext data need to be encrypted, the second component of the ciphertext data can be generated based on the plaintext data, the first component of the ciphertext data can be selected from the data set, and the ciphertext data can be calculated based on the first component and the second component. Therefore, when the plaintext data need to be encrypted, the ciphertext data can be quickly obtained.

Figure 5:
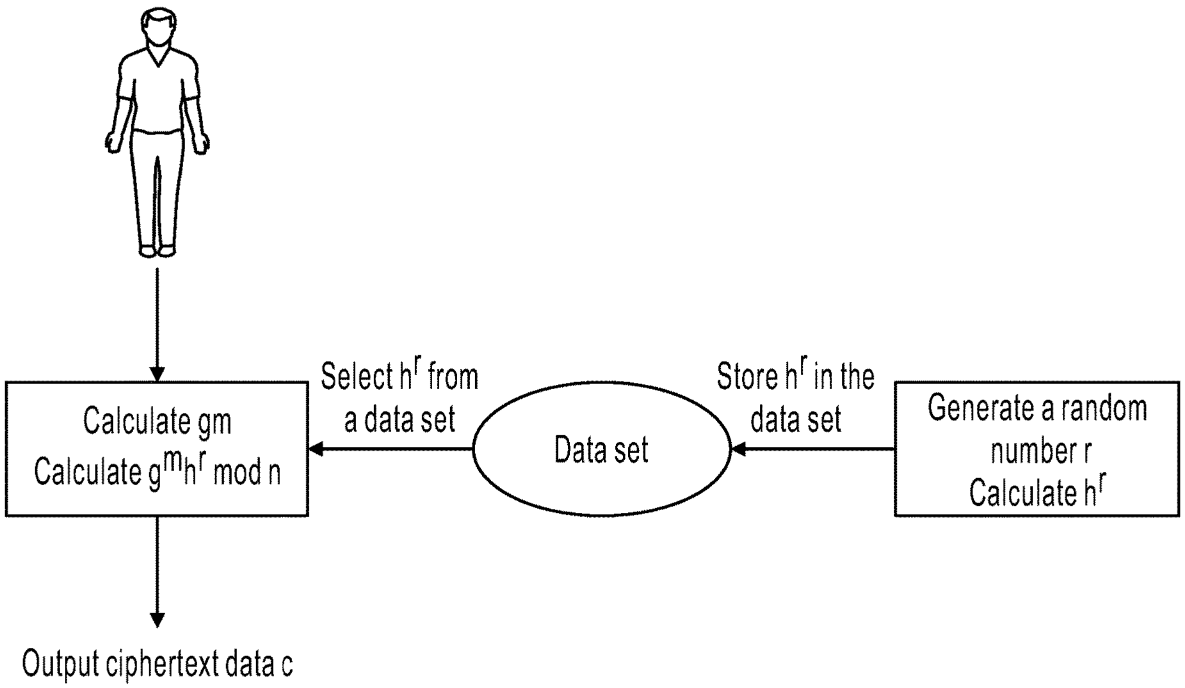
FIG. 5 is a schematic diagram illustrating an encryption process, according to some embodiments of this specification.

Referring to FIG. 5, the following describes a scenario example of some embodiments of this specification. It is worthwhile to note that, the scenario example is merely intended to better understand technical effects of some embodiments of this specification, and does not constitute an undue limitation on the embodiments of this specification.

In such a scenario example, a first encryption key, a second encryption key, and a third encryption key can be generated using a key generation algorithm. Specifically, a large prime number p and a large prime number q can be generated. $n=^2$ can be calculated. A random number g can be generated. $h=g^n \bmod n$ can be calculated. The random number g meets the following conditions: $g<n$ and $g^{-1}\neq 1$ $\bmod^2$. In such case, the public key can include (n, g, h), and the private key can include (p, q). The first encryption key can include the public key h. The second encryption key can include the public key g. The third encryption key can include the public key n.

In such a scenario example, a random number can be generated, the first component of the ciphertext data can be generated based on the random number and the first encryption key, and the first component can be stored in the data set. Specifically, the first component of the ciphertext data can be calculated based on formula $h^r$, where h represents the first encryption key, and r represents the random number.

In such a scenario example, when the plaintext data need to be encrypted, the second component of the ciphertext data can be generated based on the plaintext data and the second encryption key; the first component can be selected from the data set; the ciphertext data of the plaintext data can be calculated based on the first component, the second component, and the third encryption key. Specifically, the second component of the ciphertext data can be calculated based on formula $g^m$, where g represents the second encryption key, and m represents the plaintext data. Specifically, the ciphertext data can be calculated based on formula $c=g^m h^r \bmod n$, where $h^r$ represents the first component of the ciphertext data, $g^m$ represents the second component of the ciphertext data, and n represents the third encryption key.

In such a scenario example, for the sake of security, binary bits of the random number r, the first encryption key h, and the second encryption key g are usually 2048 bits. Binary bits of the plaintext data m are usually 64 bits. Therefore, the plaintext data m is smaller than the random number r, the first encryption key h, and the second encryption key g. Time taken for performing a power operation is related to a base value and an exponent value. Because the plaintext data m is relatively small, time taken for calculating $g^m$ is far less than time taken for calculating $h^r$. Experience shows that the time taken for calculating $h^r$ accounts for approximately 98% of the time, whereas the time taken for calculating $g^m$ accounts for approximately 2% of the time. $h^r$ is calculated in advance. As such, when the plaintext data m need to be encrypted, a calculation result of $h^r$ can be directly obtained, and calculation of $h^r$ is not needed, thereby saving 98% of the time.

Figure 6:
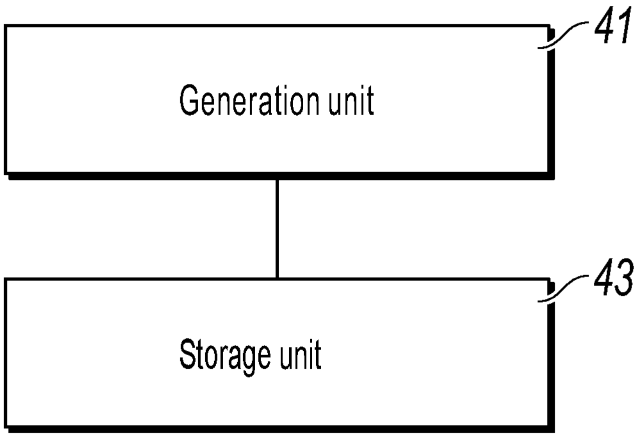
FIG. 6 is a schematic structural diagram illustrating a data preprocessing apparatus, according to some embodiments of this specification.

Referring to FIG. 6, some embodiments of this specification further provide a data preprocessing apparatus, which can specifically include the following units: a generation unit 41, configured to generate a first component of ciphertext data; and a storage unit 43, configured to store the first component in a data set so that when plaintext data need to be encrypted, a second component of the ciphertext data is generated based on the plaintext data, the first component is selected from the data set, and the ciphertext data are calculated based on the first component and the second component.

Figure 7:
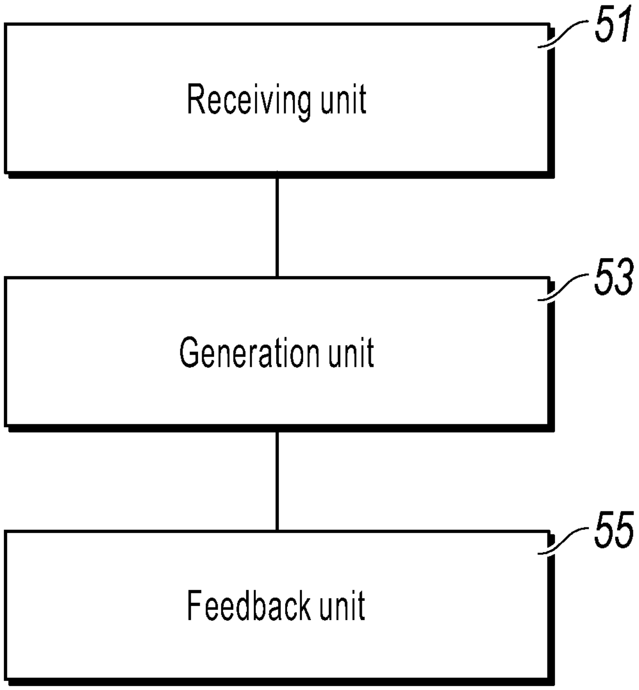
FIG. 7 is a schematic structural diagram illustrating a data preprocessing apparatus, according to some embodiments of this specification.

Referring to FIG. 7, some embodiments of this specification further provide a data preprocessing apparatus, which can specifically include the following units: a receiving unit 51, configured to receive a data acquisition request; a generation unit 53, configured to generate a first component of ciphertext data; and a feedback unit 55, configured to feed back the first component, where the first component is stored in a data set so that when plaintext data need to be encrypted, a second component of the ciphertext data is generated based on the plaintext data, the first component is selected from the data set, and the ciphertext data are calculated based on the first component and the second component.

Figure 8:
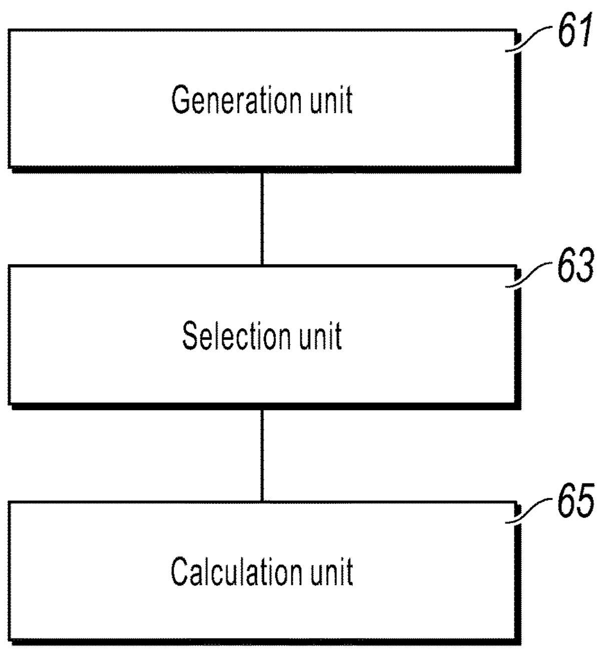
FIG. 8 is a schematic structural diagram illustrating a data encryption apparatus, according to some embodiments of this specification.

Referring to FIG. 8, some embodiments of this specification further provide an encryption apparatus, which can specifically include the following units: a generation unit 61, configured to generate a second component of ciphertext data based on plaintext data; a selection unit 63, configured to select a first component of the ciphertext data from a data set; and a calculation unit 65, configured to calculate the ciphertext data of the plaintext data based on the first component and the second component.

Figure 9:
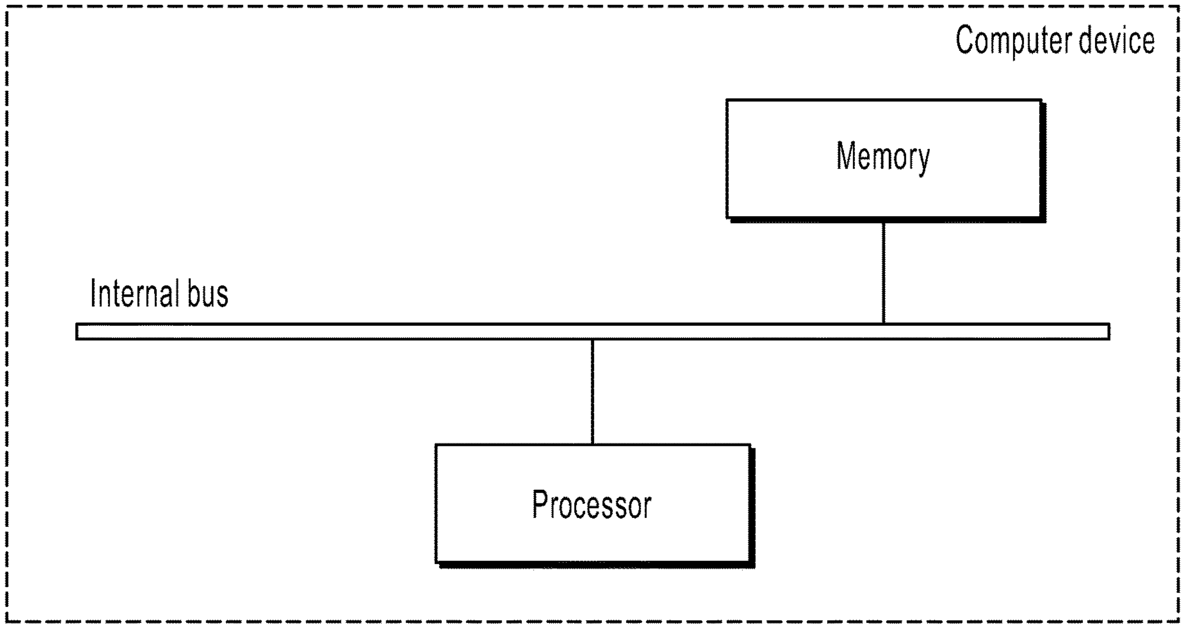
FIG. 9 is a schematic structural diagram illustrating a computer device, according to some embodiments of this specification.

Referring to FIG. 9, some embodiments of this specification further provide a computer device.

The computer device can include a memory and a processor.

The memory includes but is not limited to a dynamic random access memory (DRAM), a static random access memory (SRAM), and the like. The memory can be configured to store a computer instruction.

The processor can be implemented in any suitable methods. For example, the processor can take the form of, for example, a microprocessor or processor, a computer readable medium storing computer readable program code (such as software or firmware) executable by the microprocessor or processor, a logic gate, a switch, an application-specific integrated circuit (ASIC), a programmable logic controller, and an embedded microcontroller. The processor can be configured to execute the computer instruction to implement the embodiment corresponding to FIG. 3 or FIG. 4.

This specification further provides some embodiments of a computer storage medium. The computer storage medium includes but is not limited to a random access memory (RAM), a read-only memory (ROM), a cache, a hard disk drive (HDD), a memory card, and the like. The computer storage medium stores a computer program instruction. The computer program instruction is executed to implement a program instruction or a module in the embodiment corresponding to FIG. 3 or FIG. 4 in this specification.

It is worthwhile to note that, the embodiments in this specification are described in a progressive way. For same or similar parts of the embodiments, references can be made to the embodiments mutually. Each embodiment focuses on a difference from other embodiments. Especially, apparatus embodiments and computer device embodiments are similar to method embodiments, and therefore are described briefly. For related parts, references can be made to the descriptions in the method embodiments. In addition, it can be understood that, after reading this specification document, a person skilled in the art can figure out any combination of some or all of the embodiments enumerated in this specification without creative efforts, and these combinations also fall within the disclosure and protection scopes of this specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the some described hardware description languages and is programmed into an integrated circuit.

The system, apparatus, module, or unit illustrated in the above-mentioned embodiments can be implemented using a computer chip or an entity, or can be implemented using a product having a specific function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

It can be understood from the descriptions of the above-mentioned implementations that, a person skilled in the art can clearly understand that this specification can be implemented using software and a necessary general hardware platform. Based on such an understanding, the technical solutions in this specification essentially or the part contributing to the existing technology can be implemented in a form of a software product. The computer software product can be stored in a storage medium, such as a ROM/RAM, a magnetic disk, or an optical disc, and includes some instructions for instructing a computer device (which can be a personal computer, a server, or a network device) to perform the methods described in the embodiments or in some parts of the embodiments of this specification.

This specification can be applied to many general-purpose or special-purpose computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the above-mentioned systems or devices.

This specification can be described in the general context of computer-executable instructions, for example, a program module. Generally, the program module includes a routine, a program, an object, a component, a data structure, etc. executing a specific task or implementing a specific abstract data type. This specification can also be practiced in distributed computing environments. In the distributed computing environments, tasks are performed by remote processing devices connected through a communication network. In a distributed computing environment, the program module can be located in both local and remote computer storage media including storage devices.

Although this specification is described using some embodiments, a person of ordinary skill in the art knows that many variations and changes of this specification can be made without departing from the spirit of this specification. It is expected that the appended claims include these variations and changes without departing from the spirit of this specification.

What is claimed is:

1. A computer-implemented method, comprising:
- performing, by one or more computing devices, data preprocessing, comprising:
  - generating, independently of plaintext data, a first component of ciphertext data; and
  - storing the first component of ciphertext data in a data set;
- performing, by the one or more computing devices, data encryption, comprising:
  - in response to receiving the plaintext data, generating, based on the plaintext data, a second component of ciphertext data;

selecting, from the data set and as a selected first component of ciphertext data, the first component of ciphertext data; and calculating, based on combining the first component of ciphertext data and the second component of ciphertext data according to a homomorphic encryption algorithm, ciphertext data of the plaintext data; and outputting, by the one or more computing devices, the ciphertext data of the plaintext data.

2. The computer-implemented method of claim 1, wherein generating, based on the plaintext data, the second component of ciphertext data, comprises:

generating, based on the plaintext data and an encryption key, the second component of ciphertext data.

3. The computer-implemented method of claim 1, comprising:

deleting the selected first component of ciphertext data from the data set.

4. The computer-implemented method of claim 1, comprising:

sending a data acquisition request;

receiving, as fed back data, the first component of ciphertext data; and storing the fed back data in the data set.

5. The computer-implemented method of claim 1, wherein generating the first component of ciphertext data, comprises:

generating a random number; and generating the first component of ciphertext data based on the random number and an encryption key.

6. The computer-implemented method of claim 1, wherein generating the first component of ciphertext data, comprises:

in response to that a data volume of the data set does not reach a threshold, generating the first component of ciphertext data; or in response to that there is no task for encrypting the plaintext data, generating the first component of ciphertext data.

7. The computer-implemented method of claim 1, comprising:

for data preprocessing:

receiving a data acquisition request;

generating the first component of ciphertext data; and feeding back the first component of ciphertext data.

8. The computer-implemented method of claim 7, wherein generating the first component of ciphertext data comprises:

generating a plurality of first components of ciphertext data in batches; and the feeding back the first component of ciphertext data, comprises:

feeding back the plurality of first components of ciphertext data.

9. A non-transitory, computer-readable medium storing one or more instructions executable by a computer system to perform one or more operations, comprising:

performing, by one or more computing devices, data preprocessing, comprising:

generating, independently of plaintext data, a first component of ciphertext data; and storing the first component of ciphertext data in a data set;

performing, by the one or more computing devices, data encryption, comprising:

in response to receiving the plaintext data, generating, based on the plaintext data, a second component of ciphertext data;

selecting, from the data set and as a selected first component of ciphertext data, the first component of ciphertext data; and calculating, based on combining the first component of ciphertext data and the second component of ciphertext data according to a homomorphic encryption algorithm, ciphertext data of the plaintext data; and outputting, by the one or more computing devices, the ciphertext data of the plaintext data.

10. The non-transitory, computer-readable medium of claim 9, wherein generating, based on the plaintext data, the second component of ciphertext data, comprises:

generating, based on the plaintext data and an encryption key, the second component of ciphertext data.

11. The non-transitory, computer-readable medium of claim 9, comprising:

deleting the selected first component of ciphertext data from the data set.

12. The non-transitory, computer-readable medium of claim 9, comprising:

sending a data acquisition request;

receiving, as fed back data, the first component of ciphertext data; and storing the fed back data in the data set.

13. The non-transitory, computer-readable medium of claim 9, wherein generating the first component of ciphertext data, comprises:

generating a random number; and generating the first component of ciphertext data based on the random number and an encryption key.

14. The non-transitory, computer-readable medium of claim 9, wherein generating the first component of ciphertext data, comprises:

in response to that a data volume of the data set does not reach a threshold, generating the first component of ciphertext data; or in response to that there is no task for encrypting the plaintext data, generating the first component of ciphertext data.

15. The non-transitory, computer-readable medium of claim 9, comprising:

for data preprocessing:

receiving a data acquisition request;

generating the first component of ciphertext data; and feeding back the first component of ciphertext data.

16. The non-transitory, computer-readable medium of claim 15, wherein generating the first component of ciphertext data comprises:

generating a plurality of first components of ciphertext data in batches; and the feeding back the first component of ciphertext data, comprises:

feeding back the plurality of first components of ciphertext data.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

performing data preprocessing, comprising:

generating, independently of plaintext data, a first component of ciphertext data; and storing the first component of ciphertext data in a data set;

performing data encryption, comprising:

in response to receiving the plaintext data, generating, based on the plaintext data, a second component of ciphertext data;

selecting, from the data set and as a selected first component of ciphertext data, the first component of ciphertext data; and calculating, based on combining the first component of ciphertext data and the second component of ciphertext data according to a homomorphic encryption algorithm, ciphertext data of the plaintext data; and outputting the ciphertext data of the plaintext data.

18. The computer-implemented system of claim 17, wherein generating, based on the plaintext data, the second component of ciphertext data, comprises:

generating, based on the plaintext data and an encryption key, the second component of ciphertext data.

19. The computer-implemented system of claim 17, the one or more operations comprising:

deleting the selected first component of ciphertext data from the data set.

20. The computer-implemented system of claim 17, the one or more operations comprising:

sending a data acquisition request;

receiving, as fed back data, the first component of ciphertext data; and storing the fed back data in the data set.

* * * * *